Feb. 5, 1963  H. HOFMANN  3,076,656
HYDRODYNAMIC SEAL ESPECIALLY FOR
PUMPS, COMPRESSORS AND TURBINES

Filed Dec. 23, 1960  2 Sheets-Sheet 1

INVENTOR.
HANS HOFFMAN
BY

United States Patent Office 3,076,656
Patented Feb. 5, 1963

3,076,656
HYDRODYNAMIC SEAL ESPECIALLY FOR PUMPS, COMPRESSORS AND TURBINES
Hans Hofmann, Heidenheim (Brenz), Germany, assignor to J. M. Voith G.m.b.H., Heidenheim (Brenz), Germany
Filed Dec. 23, 1960, Ser. No. 77,920
Claims priority, application Germany Dec. 28, 1959
14 Claims. (Cl. 277—16)

The present invention relates to a hydrodynamic seal, especially for pumps, compressors and turbines. The customary sliding or contact seals such as slide ring seals, stuffing boxes and the like have the drawback that they are subject to considerable wear. This drawback is avoided with the so-called hydrodynamic seals according to which the sealing is effected by means of a separate sealing medium having a higher pressure than the pressure prevailing in the chamber to be sealed.

In one arrangement the liquid leaking through the sealing gap is returned by means of a thread-like groove in the shaft. This type of shaft seal is, however, employable only at high circumferential speeds or at low pressure differences because otherwise, the required length of the thread-like groove will be too great.

It is, therefore, an object of the present invention to provide a hydrodynamic seal which will overcome the drawbacks that have been characteristic of former seals of this nature.

It is an object of this invention to provide a hydrodynamic seal which will always operate satisfactorily regardless of the relative speed of the parts to be sealed against each other.

These and other objects and advantages of the invention will appear more clearly from the following specification in connection with the accompanying drawings, in which.

Figure 1:
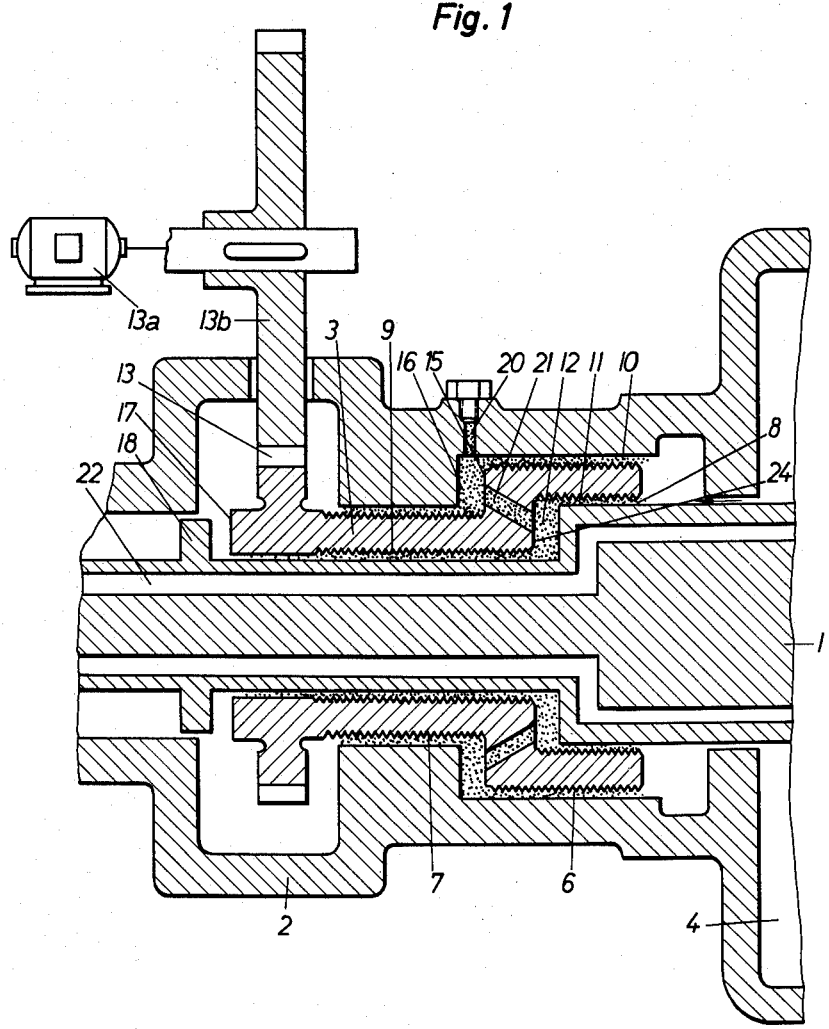
FIGURE 1 represents a partial section through a seal according to the present invention with a motor driven bushing.

More specifically, the present invention concerns a hydrodynamic seal with two sections with helical viscosity grooves arranged to feed in opposite direction and associated with each sealing gap and arranged at least at one of the machine parts to be sealed relative to each other. In conformity with the present invention, a hydrodynamic seal of this type has an annular intermediate member or bushing arranged at the portion to be sealed between the two machine parts. This intermediate member or bushing forms with each of the two machine parts one sealing gap each with two oppositely feeding viscosity grooves. According to a further feature of the hydrodynamic seal according to the invention, the said intermediate member is provided with a drive, especially with a hydraulic, pneumatic, or electric drive. The drive of the intermediate member may be effected independently of the drive of the machine part or machine parts. Furthermore, in certain circumstances it may be advisable to provide a variable drive for the intermediate member.

It is also advantageous to drive the annular intermediate member by means of a Pelton turbine or by means of a Pelton turbine-like pressure medium drive. As driving medium for such drive, lubricating oil has proved particularly suitable.

The drawbacks of the prior art have been overcome by means of the hydrostatic seal according to the invention, according to which the two sections which pertain to each other and are arranged in the sealing gap, are provided with viscosity grooves at different diameter ranges so that the sealing gap will be offset in radial direction between the sections with viscosity grooves, and that the intermediate member is axially displaceable. Furthermore, it is suggested in conformity with the present invention, so to design and dimension the surfaces of the intermediate member which are acted upon by the inner and outer pressure in axial direction, and also those annular surfaces of the intermediate member which are located between each two cooperating sections with viscosity grooves, so that equilibrium will prevail between the axial forces which, during the operation of the machine and a contact-free axial position of the intermediate member, are exerted upon the latter. This corresponds to the position as running seal. Moreover, in conformity with the present invention, during a standstill and/or an inoperativeness of the drive for the intermediate member, the latter will, due to the axial forces acting thereupon, be displaced in such a way that it will in one end position sealingly engage each of the two machine parts to be sealed with regard to each other. In this way, the intermediate member or bushing is also able to act as a seal during a standstill. In this way, an adequate seal will be obtained at a standstill of the machine parts as well as at a standstill of the intermediate member.

In connection with the above, it is advantageous to provide the arrangement in such a way that at an operational standstill, the mutually contacting surfaces of the machine part and of the intermediate member will be located in the sealing gap range between two cooperating viscosity grooves at different diameters. The costs and axial length of the seal can in this way be reduced.

According to the present invention, it is furthermore provided to design the intermediate member as bushing with cylindrical surfaces extending substantially in axial direction. The sealing gaps between the intermediate member and the machine parts are, in further development of the invention, so dimensioned that the intermediate member will in radial direction be automatically centered by the pressure exerted by the thread sections. A centering of the intermediate member or bushing may also be obtained by designing as multi-surface friction bearing one or more sections at the inner or outer wall of the rotating bushing and of the machine part pertaining thereto.

For purposes of increasing the effectiveness of the seal during operation, and in particular in order to maintain the viscosity of the sealing medium as constant as possible, it is furthermore advantageous to provide cooling passages in the machine parts and/or the intermediate member which are adjacent to the sealing gaps and to pass a cooling fluid through said cooling passages.

Referring now to the drawing in detail, the rotatable shaft 1 has mounted thereon a substantially cylindrical bushing 3 which is floatingly journalled in radial and axial direction. The journalling in radial direction is effected exclusively by means of the sealing medium 12, for instance oil, between the bushing 3 and shaft 1 or the stationary housing 2. The sealing medium 12 is, prior to starting the sealing operation passed through a feeding line 20 and compensating bores 21 into the sealing gaps 10 and 11.

The reference numeral 4 designates the machine chamber to be sealed which is assumed to have a superatmospheric pressure. When the machine or the intermediate member or bushing 3 is at a standstill, the pressure of the machine chamber 4 acts upon that end face 14 of the bushing which faces the machine chamber 4. As a result thereof, bushing 3 is displaced in axial direction toward the left until the annular surface 15 sealingly engages a counter-surface 16 of housing 2. At the same time, also the other end face 17 of bushing 3 which end face faces away from machine chamber 4 engages a shaft flange or collar 18 (FIG. 1). In this way, also at a complete standstill of the machine and the intermediate member or bushing 3, the working medium to be sealed will be prevented from escaping through the sealing gaps 10 and 11.

Figure 2:
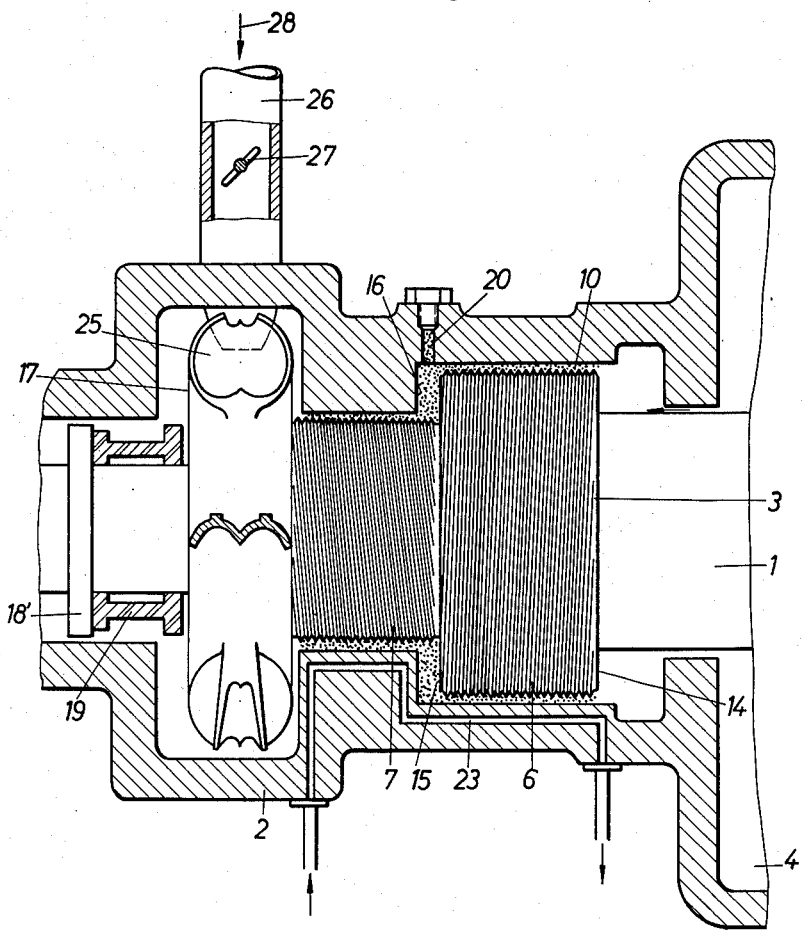
FIGURE 2 is a section through a modified sealing arrangement according to the invention.

With the arrangement shown in FIG. 2, a diaphragm seal 19 of elastic material as, for instance of elastic plastic is provided between the end face 17 of bushing 3 and the shaft flange 18' whereby an uneven distance between the engaging surfaces effective during a standstill will be compensated for.

On each of the outer and inner cylinder surfaces of bushing 3 there are provided oppositely feeding viscosity grooves 6, 7 and 8, 9, respectively. If, now, between bushing 3 and housing 2 or shaft 1 there occurs a relative rotative movement, more specifically by a rotation of bushing 3 by means of an electric motor 13a and spur gears 13b and 13, the sealing medium 12 will be fed through viscosity grooves 6, 7, 8, 9 partially from both sides to the middle of the sealing gaps 10 and 11. The pressure built up in this manner is considerably higher than the pressure in the machine chamber 4 so that due to this high pressure in the sealing medium 12, the sealing gaps 10, 11 will be sealed. Furthermore, the bushing 3 will be displaced in axial direction in such a way that all axial forces (outer and inner pressure and pressure of the sealing medium) acting upon the bushing will be at an equilibrium. Thus, the bushing 3 will automatically adjust itself in axial direction so as to occupy a contact-free position.

Shaft 1 and/or housing 2 have arranged therein cooling passages 22 and 23 respectively through which a cooling medium flows in order to maintain the viscosity of the sealing medium as constant as possible. The high speed rotation and the high temperature of the working medium to be sealed may otherwise be unfavorably affected by the sealing medium 12, reducing the viscosity thereof. FIGURE 2 differs from FIGURE 1 primarily in that the bushing 3 has mounted thereon a rotor with Pelton blades 25, said rotor being driven by a medium as, for instance, oil or air under pressure conveyed through a nozzle. This nozzle is arranged at the end of a conduit 26. The quantity of flow through said conduit 26 may be controlled by means of a throttle 27 the actuation of which will bring about a speed control of the driven bushing. However, the rotor 25 may also be driven by lubricating oil conveyed by the lubricating pump of the drive through conduit 26 to the above-mentioned nozzle, the viscosity seal being arranged on said drive.

As will be evident from the above, the seal according to the present invention makes it possible satisfactorily hydrodynamically to seal a shaft passage or the like at any condition of operation even if the relative speeds of the machine parts are low or vary considerably, and even at a standstill. The drive of the intermediate member of the seal according to the invention will assure that the relative speeds required for a proper seal between the machine parts and the intermediate member will always be maintained or may even be adjusted or controlled. The required blocking or sealing pressure may thus be adapted in any condition of operation to the pressure to be sealed. The hydrodynamic seal according to the present invention operates with a leakage loss of, for instance, 5 grams per year. The seal thus completely safely seals off and in this respect fully equals contact seals.

It is, of course, to be understood that the present invention is, by no means, limited to the particular constructions shown in the drawings, but also comprises any modifications within the scope of the appended claims.

What I claim is:

1. In a hydrodynamic sealing arrangement, especially for the shafts of pumps, compressors, and turbines: a first machine member having an opening therein, a second machine member extending through said opening and confining with said first machine member a passage to be sealed, an annular intermediate member interposed between said first and said second machine member near said passage to be sealed and confining with said machine members an inner and an outer sealing gap respectively, each of said sealing gaps being at least partly confined by wall portions of said machine members and of said intermediate member, said wall portions having two helical grooves therein with opposite direction, and driving means causing relative speed between said intermediate member and each of said machine members.

2. In a hydrodynamic sealing arrangement, especially for the shafts of pumps, compressors, and turbines: a first machine member having an opening therein, a second machine member extending through said opening and confining with said first machine member a passage to be sealed, an annular intermediate member interposed between said first and said second machine member near said passage to be sealed and confining with said machine members an inner and an outer sealing gap respectively, each of said sealing gaps being at least partly confined by substantially cylindrical wall portions of said machine members and of said intermediate member, said wall portions having two helical grooves therein with opposite direction so as to be able to feed fluid toward each other in response to a rotation of said intermediate member for rotating the same, and driving means drivingly connected to said intermediate member for rotating same.

3. In a hydrodynamic sealing arrangement, especially for the shafts of pumps, compressors, and turbines: a first machine member having an opening therein, a second machine member extending through said opening and confining with said first machine member a passage to be sealed and confining with said machine members an inner and an outer sealing gap respectively, one of said machine members being rotatable, an annular intermediate member interposed between said first and said second machine member near said passage to be sealed, each of said sealing gaps being at least partly confined by a substantially cylindrical wall portion of said intermediate member having two helical grooves therein with opposite direction so as to be able to feed fluid toward each other in response to a rotation of said intermediate member, and driving means drivingly connected to said intermediate member for rotating the same, said driving means being operable independently of the rotation of said machine member.

4. An arrangement according to claim 2, in which the speed of said driving means is variable.

5. In a hydrodynamic sealing arrangement, especially for the shafts of pumps, compressors, and turbines: a first machine member having an opening therein, a second machine member extending through said opening and confining with said first machine member a passage to be sealed, an annular intermediate member interposed between said first and said second machine member near said passage to be sealed and confining with said machine members an inner and an outer sealing gap respectively, each of said sealing gaps being partly confined by a substantially cylindrical wall portion of said intermediate member having two helical grooves therein with opposite direction so as to be able to feed fluid toward each other in response to a rotation of said intermediate member, and Pelton turbine means drivingly connected to said intermediate member for rotating the same.

6. In a hydrodynamic sealing arrangement, especially for the shafts of pumps, compressors, and turbines: a first machine member having an opening therein, a second machine member extending through said opening and confining with said first machine member a passage to be sealed, and an annular intermediate member interposed between said first and said second machine member near said passage to be sealed and confining with said machine members an inner and an outer sealing gap respectively, each of said sealing gaps being partly confined by a substantially cylindrical wall portion of said intermediate member having two helical grooves therein with opposite direction so as to be able to feed fluid toward each other in response to a rotation of said intermediate member, said intermediate member being provided with Pelton turbine-like pressure fluid driving means for rotating said intermediate member.

7. A hydrodynamic sealing arrangement according to claim 5, which includes conduit means for conveying lubricating oil under pressure to said Pelton turbine means.

8. A hydrodynamic sealing arrangement according to claim 6, which includes conduit means for supplying lubricating oil under pressure to said Pelton turbine-like pressure fluid driving means.

9. In a hydrodynamic sealing arrangement, especially for the shafts of pumps, compressors, and turbines: a first machine member having an opening therein, a second machine member extending through said opening and confining with said first machine member a passage to be sealed, said first and second machine members confining therebetween an annular chamber having a first section and a second section radially offset with regard to each other, an annular intermediate member axially displaceably arranged within certain limits within said annular chamber and having two sections radially offset with regard to each other in conformity with the radially offset sections of said annular chamber, said intermediate member confining with said first and second members an inner and an outer sealing gap respectively so that each of said gaps has radially offset sections in conformity with the radially offset sections of said annular chamber each of said sealing gaps being partly confined by a substantially cylindrical wall portion of said intermediate member having two helical grooves therein with opposite direction so as to be able to feed fluid toward each other in response to a rotation of said intermediate member, and driving means drivingly connected to said intermediate member for rotating the same.

10. In a machine comprising a hydrodynamic sealing arrangement: a first machine member having an opening therein, a second machine member extending through said opening and confining with said first machine member a passage to be sealed, said first and second machine members confining therebetween an annular chamber having a first section and a second section radially offset with regard to each other, an annular intermediate member axially displaceably arranged within certain limits within said annular chamber and having two sections radially offset with regard to each other in conformity with the radially offset sections of said annular chamber, said intermediate member confining with said first and second members an inner and an outer sealing gap respectively so that each of said gaps has radially offset sections in conformity with the radially offset sections of said annular chamber, each of said sealing gaps being partly confined by a substantially cylindrical wall portion of said intermediate member having two helical grooves therein with opposite direction so as to be able to feed fluid toward each other in response to a rotation of said intermediate member, and driving means drivingly connected to said intermediate member for rotating the same, the end faces of said intermediate member and the intermediate radially extending surfaces of said intermediate member which are located intermediate said end faces and separate the radially offset sections of said intermediate member from each other being so dimensioned that the axial forces exerted upon said end faces and said intermediate surfaces will be balanced during operation of said machine and with said intermediate member free from contact with said first and second members, and that during a period of non rotation of at least one of the said first and second members and non rotation of said intermediate member the axial forces acting upon said intermediate member will move the latter into sealing engagement with said first and second members.

11. An arrangement according to claim 10, in which those surfaces of one of said machine members and of said intermediate member which contact each other during an operational standstill are formed by one of said intermediate surfaces and a respectively adjacent oppositely located surface of the respective machine member.

12. A sealing arrangement according to claim 1, in which said intermediate member is designed as bushing with cylindrical surfaces extending in substantially axial direction thereof.

13. A sealing arrangement according to claim 1, which includes cooling passage means in said first machine member near the adjacent sealing gap.

14. A sealing arrangement according to claim 1, which includes cooling passage means in said second machine member near the adjacent sealing gap.

References Cited in the file of this patent
UNITED STATES PATENTS

| | | |
|---|---|---|
| 1,402,349 | Geer | Jan. 31, 1922 |
| 2,014,859 | Mitchell | Sept. 17, 1935 |
| 2,330,730 | Mosshart | Sept. 28, 1943 |